May 17, 1955

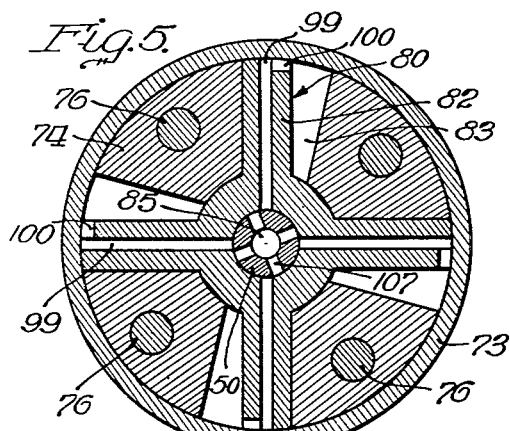
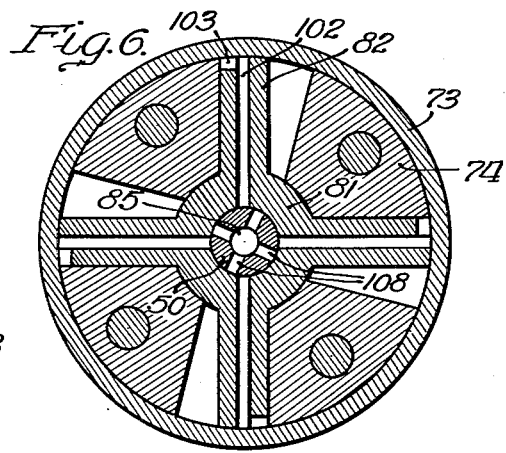
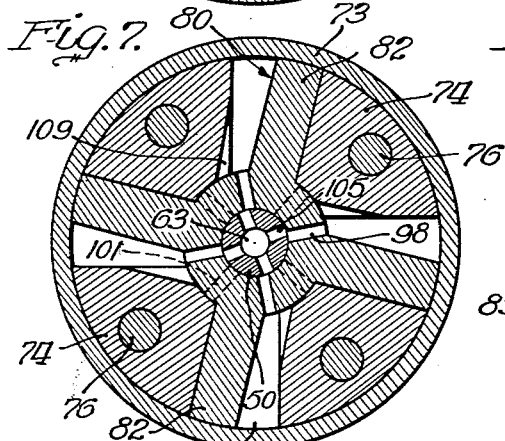
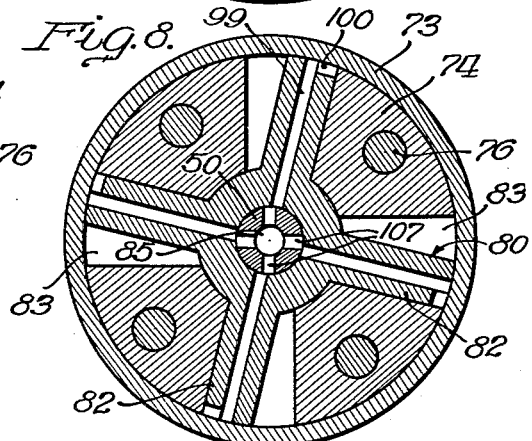
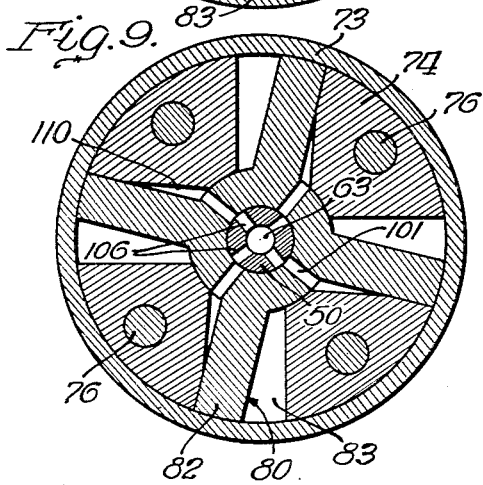
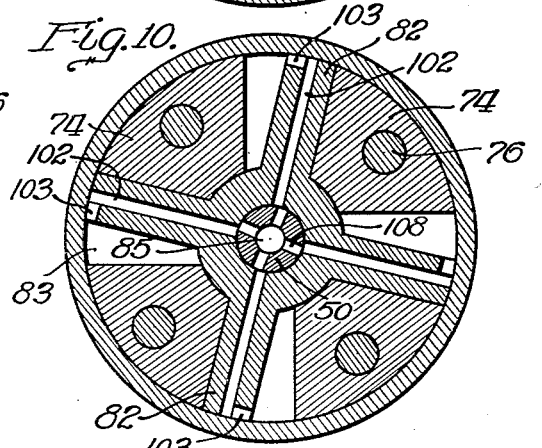

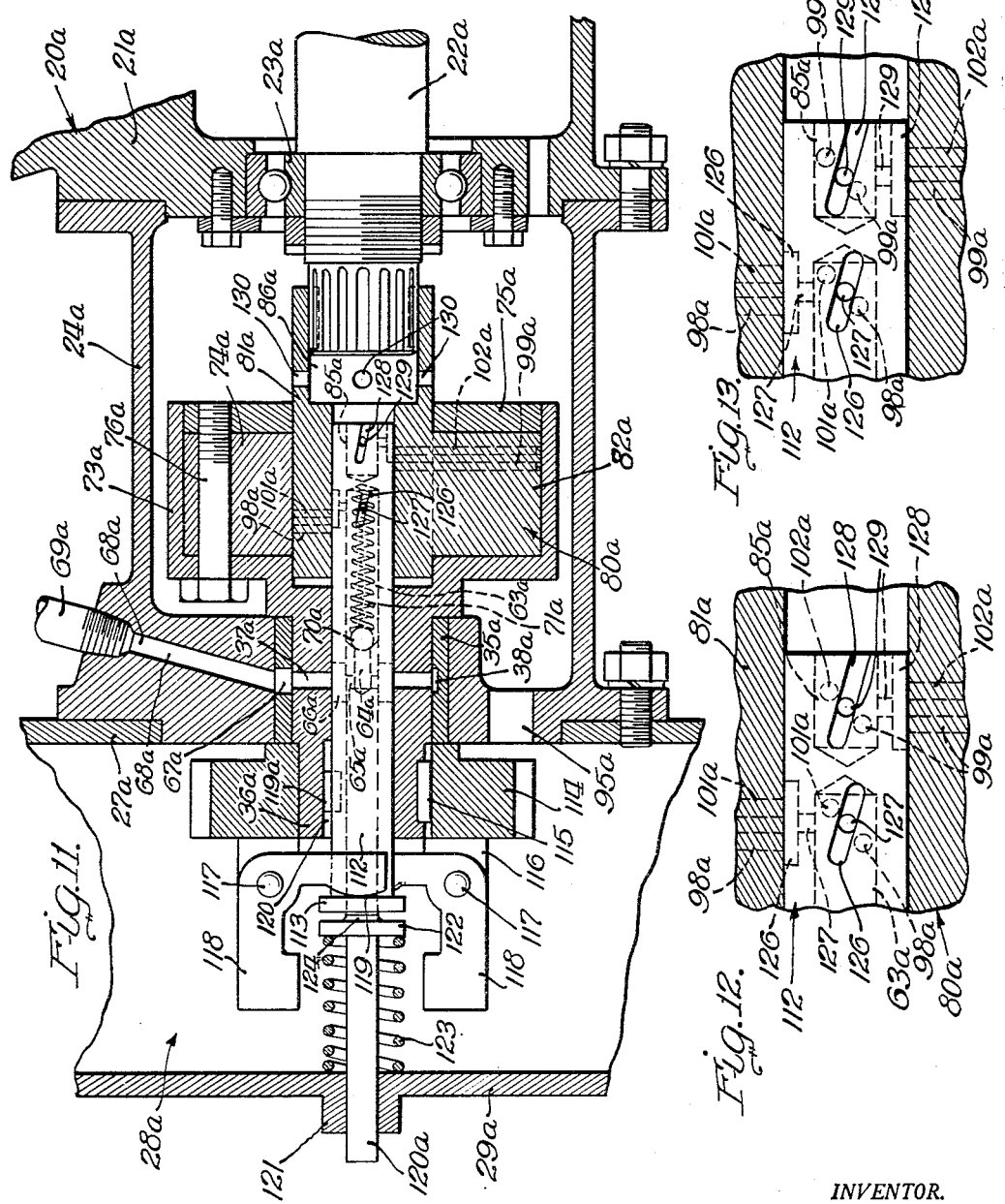

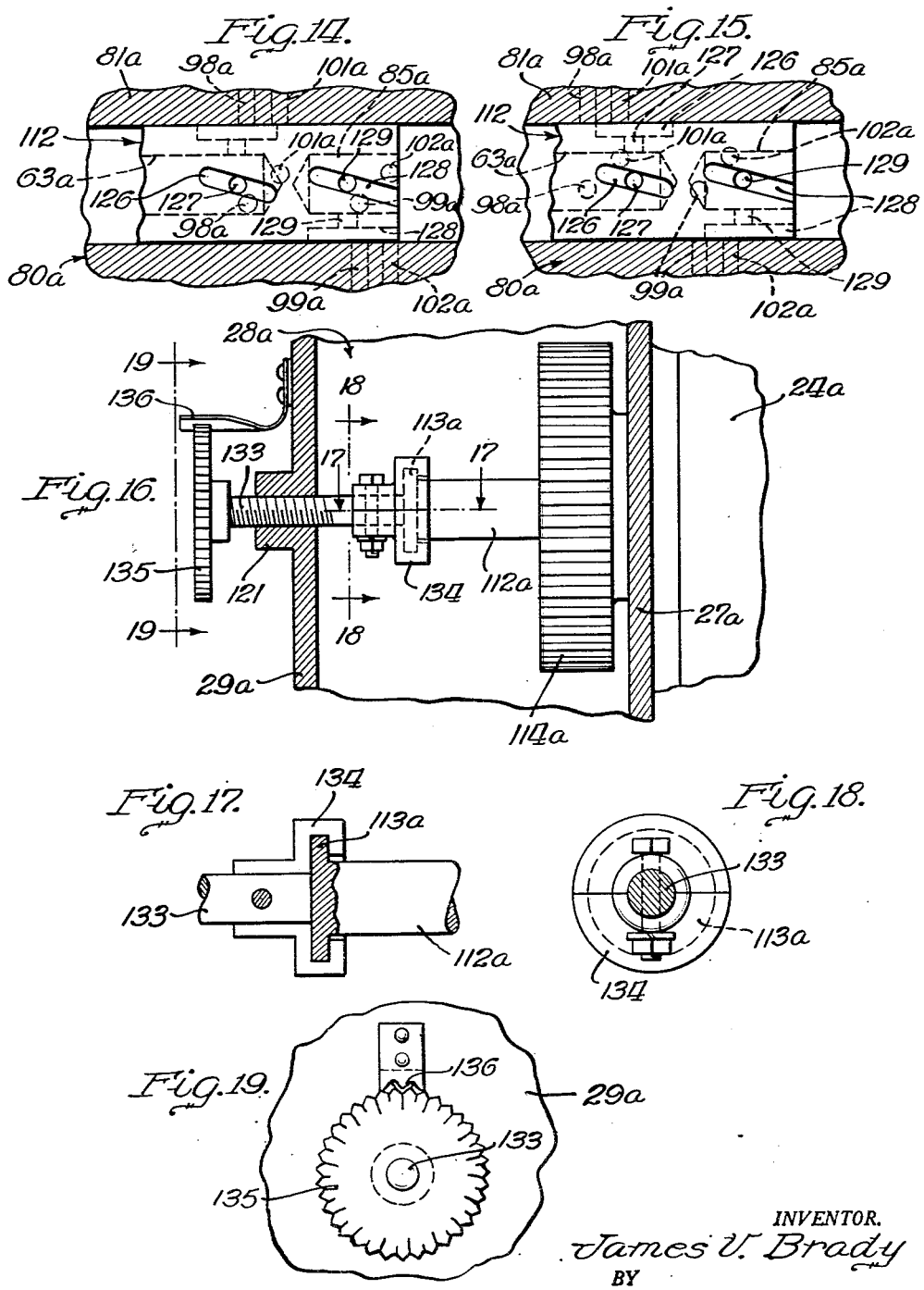

J. V. BRADY 2,708,353

HYDRAULIC TIMING MEANS

Filed Nov. 6, 1951

INVENTOR.
James V. Brady
BY
Brown, Jackson, Boettcher & Dienner.
Attys.

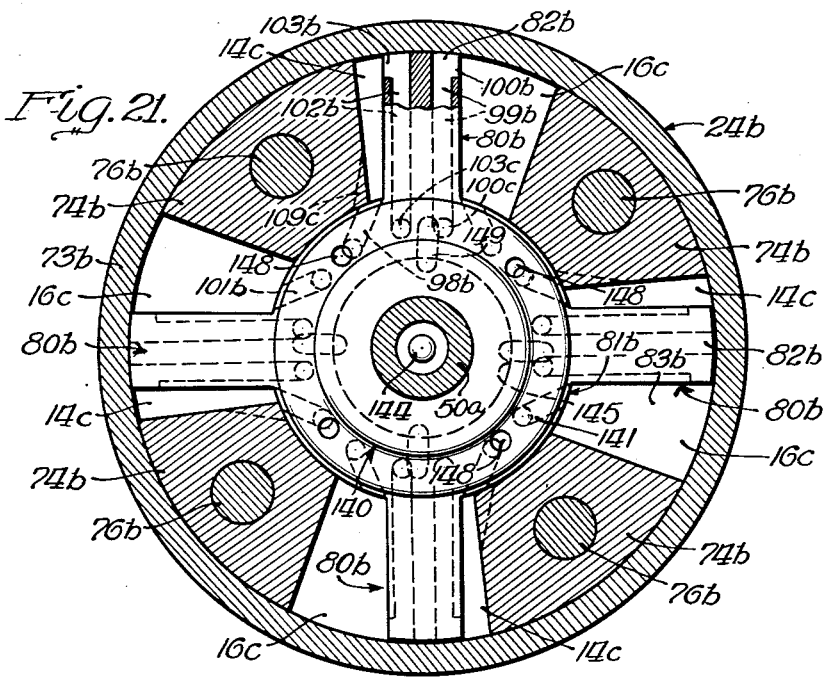
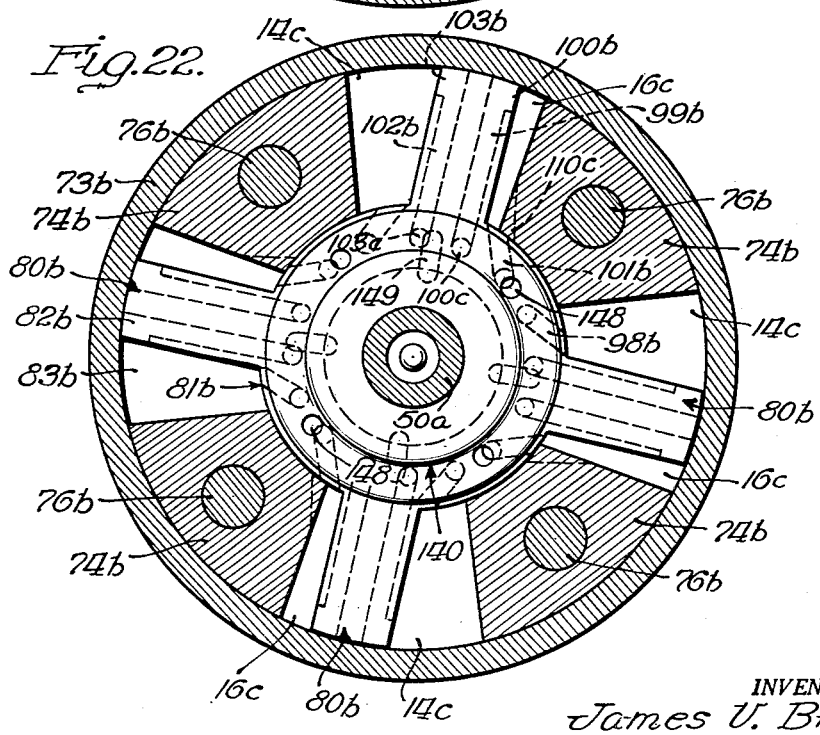

ns and accuracy in operation. Further objects and

United States Patent Office 2,708,353
Patented May 17, 1955

2,708,353

HYDRAULIC TIMING MEANS

James V. Brady, New York, N. Y., assignor to Lanova Corporation, Long Island City, N. Y., a corporation of Delaware Application November 6, 1951, Serial No. 255,091

5 Claims. (Cl. 64—25)

This invention relates to means for varying the angular relation between a drive shaft and a shaft driven thereby, for timing the injection or admission of fuel in internal combustion engines, and analogous purposes.

Injection or diesel engines are quite sensitive to the timing of the injection of fuel. It is desirable for most efficient operation of injection engines, particularly engines operating over a wide speed range, to advance and retard the injection timing in accordance with increase and decrease in engine speed. In injection engines operating over a narrow speed range it is often desirable to provide means whereby the injection timing may be set to suit the particular fuel used, thereby enabling the use of various fuels, from fuel oil to gasoline, such an arrangement being commonly termed an octane selector. Injection timing devices and so called octane selectors are both known. In general the known devices are rather complicated and expensive in construction, lack sensitiveness in operation and often are inadequately lubricated.

My invention is directed to means for varying the angular relation between a drive shaft and a shaft driven thereby, particularly suitable for use as injection timing means, or as an octane selector, but suitable also for other purposes. The drive shaft has driving connection to the driven shaft through a hydraulic servo-motor effective for varying the angular relation between the shafts. As used with injection engines, the drive shaft is driven from the engine shaft, the driven shaft is the operating or cam shaft of the injection pump, and the servo-motor is controlled by valve means. The valve means may be adjustable responsive to the speed of the drive shaft, to provide automatic adjustment of injection timing, or may be adjusted manually for use of the device as an octane selector. The valve means comprises a control valve adjustable relative to the housing and the rotor of the servo-motor, the rotor being turnable relative to the housing and the control valve. The latter and the rotor are provided with cooperating ports and ducts or passages for admitting and discharging operating hydraulic fluid to and from the servo-motor effective for turning the rotor in proper direction to an appropriate extent for effecting and maintaining desired angular adjustment of the driven or pump cam shaft relative to the drive shaft. Conveniently, the operating hydraulic fluid is the engine lubricating oil delivered by the usual oil pump from the engine crank case sump to the servo-motor under substantial pressure. The servo-motor is provided with means for preventing clogging thereof by dirt contained in the oil and is also provided with means guarding against movement of the rotor relative to the housing due to variations in torque required to drive the injection pump shaft, which is maximum at the instant of injection and then rapidly falls to a minimum. All of the moving parts of the servo-motor and the control valve and associated parts operate in oil so that no appreciable friction occurs, which is conducive to sensitiveness and accuracy in operation. Further objects and advantages of my invention will appear from the detail description.

In the drawings:

Figure 1 is a lengthwise central vertical sectional view, taken substantially on line 1—1 of Figure 2, of injection timing means embodying my invention, certain parts being shown in elevation and certain other parts being shown partly in elevation and partly broken away and in section, the injection pump being shown fragmentarily and the parts being shown in the positions which they occupy when the injection pump cam shaft is in full retard position;

Figure 5 is a sectional view taken substantially on line 5—5 of Figure 1;

Figure 6 is a sectional view taken substantially on line 6—6 of Figure 1;

Figure 7 is a sectional view similar to Figure 3, but with the parts in the positions which they occupy at the full advanced position of the injection pump cam shaft;

Figure 8 is a sectional view similar to Figure 5, but with the parts in the positions which they occupy at the full advanced position of the pump cam shaft;

Figure 9 is a sectional view similar to Figure 4, but with the control valve in position to cause turning of the injection pump cam shaft in retard direction and the parts otherwise in the positions which they occupy when the injection pump shaft is in full advanced position;

Figure 10 is a sectional view similar to Figure 6, but with the control valve and the other parts in the positions which they occupy in Figure 9;

Figure 11 is a sectional view similar to Figure 1, but showing a modified form of timing means embodying my invention;

Figure 1:
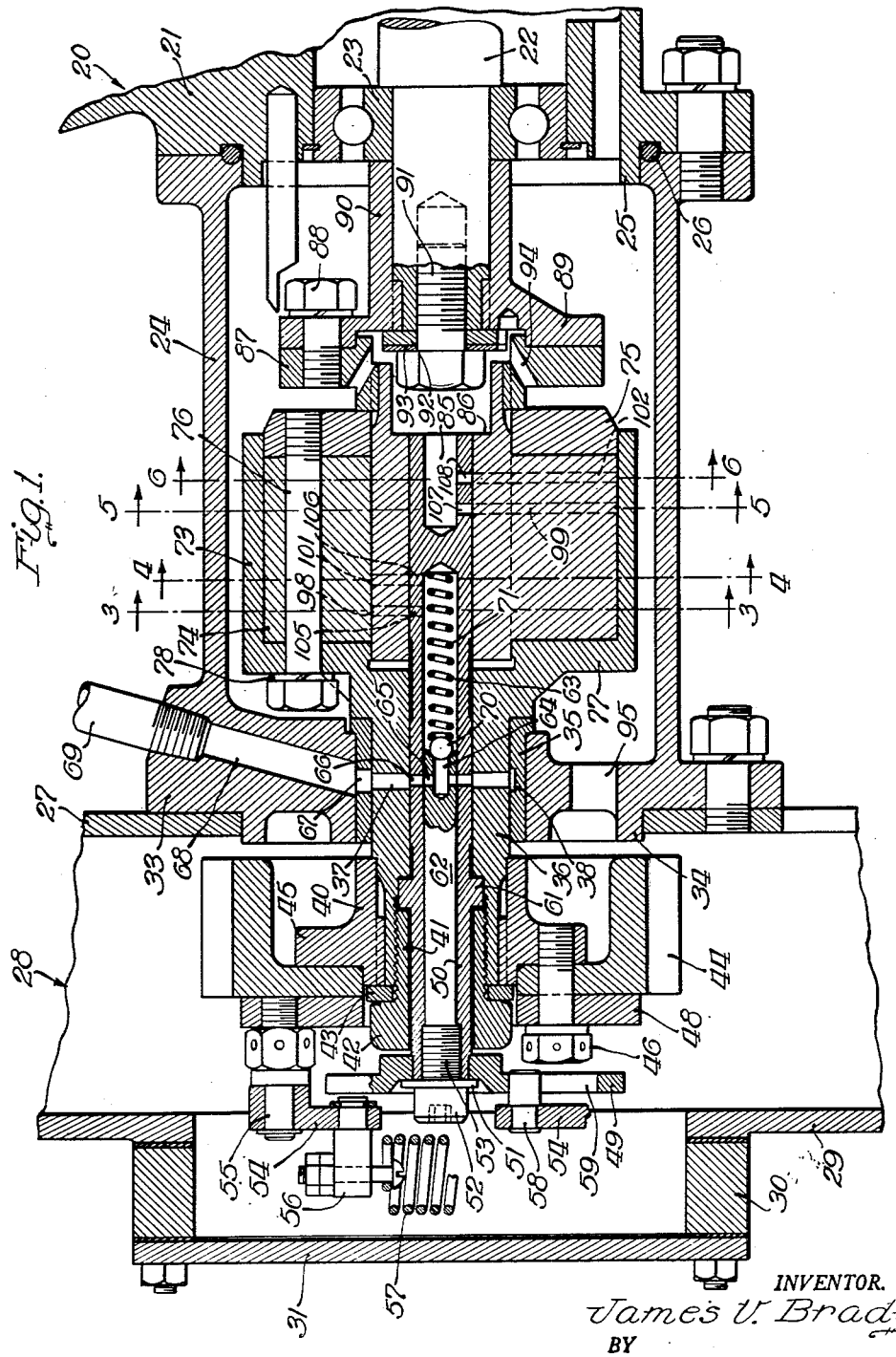
Figure 20:
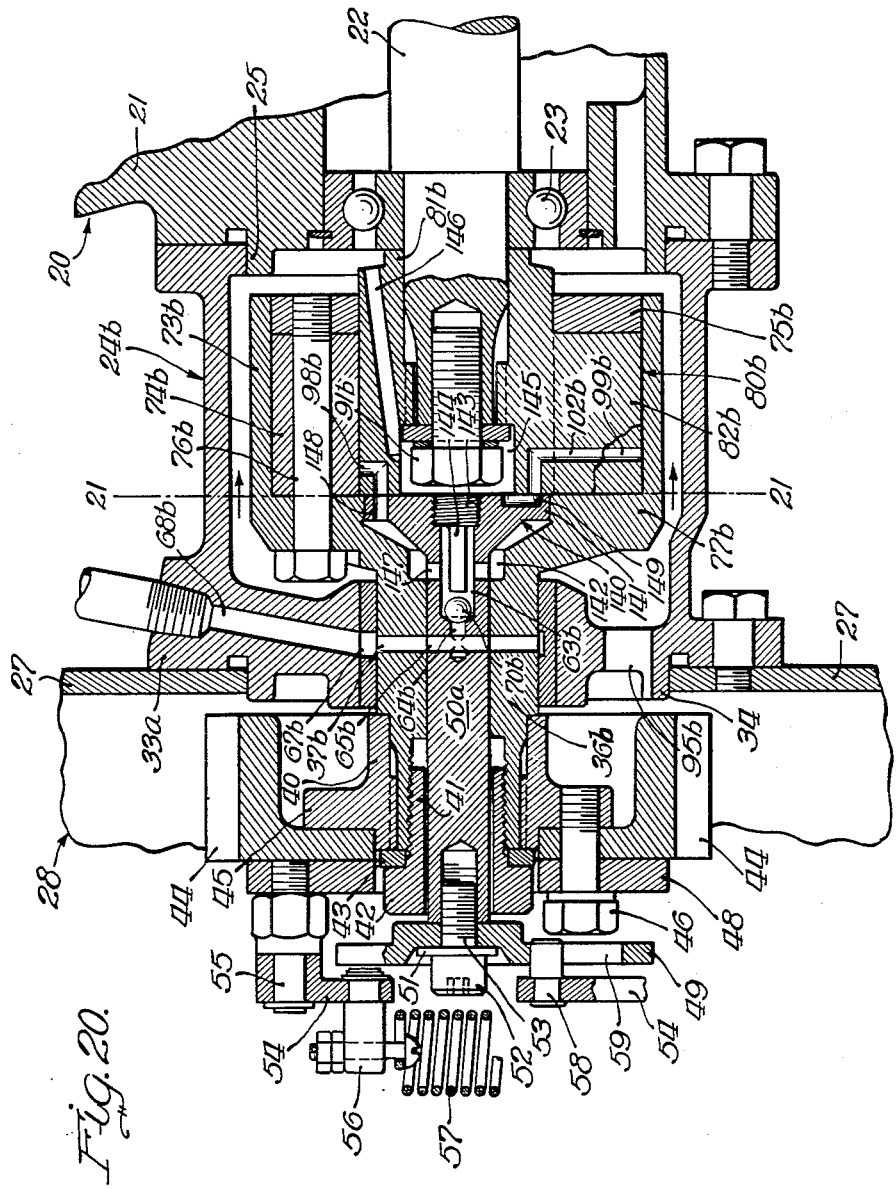

Figure 12 is a fragmentary lengthwise central vertical sectional view, on an enlarged scale, of the servo-motor rotor of the timing means of Figure 11, showing the control valve fragmentarily in elevation, the parts being in the positions which they occupy when the control valve is in an intermediate position and the rotor is in a position in which all of the ducts thereof are closed by the control valve;

Figure 13 is a view similar to Figure 12 but with the parts in the positions which they occupy when the control valve is moved slightly in advance direction with the advance ducts of the rotor cracked slightly open;

Figure 14 is a view similar to Figure 12 but with the parts in the positions which they occupy when the control valve is in full advance position;

Figure 15 is a view similar to Figure 12 but with the parts in the positions which they occupy when the control valve is in full retard position;

Figure 16 is a fragmentary lengthwise vertical central view, with certain parts shown in elevation, of a second modified form of timing means embodying my invention;

Figure 17 is a sectional view, on an enlarged scale, taken substantially on line 17—17 of Figure 16, certain parts being shown in elevation;

Figure 18 is a sectional view, on an enlarged scale, taken substantially on line 18—18 of Figure 16;

Figure 19 is an end view of the timing means of Figure 16, taken substantially on line 19—19 of Figure 16;

Figure 20 is a sectional view similar to Figure 1 of a third modified form of injection timing means embodying my invention;

Figure 21 is a transverse sectional view, on an enlarged scale, with the parts in the positions which they occupy during advancing of injection; and Figure 22 is a view similar to Figure 21 but with the parts in the positions which they occupy during retarding of injection.

The timing means of my invention is particularly suitable for use with injection engines and will be so described, though in its broader aspects it may be used for other purposes, as above noted. I have shown the timing means of my invention, by way of example, as used with an injection pump 20, which may be any suitable known pump, having a casing 21 and an operating cam shaft 22 rotatably mounted in ball bearings 23. A cylindrical casing 24 is bolted to one end of the pump casing 21, about an annular flange 25 thereof, with an intervening sealing O ring 26. The casing 24 is coaxial wtih cam shaft 22 and is bolted at its other end to an inner plate 27 of a casing 28 which extends upwardly from and opens downwardly into the crank case (not shown) of an injection engine with which the injection pump 20 is associated. The casing 28 is provided with a front wall or plate 29 having a circular opening therein about which is disposed an annular collar 30 on the outer end of which seats a cover plate 31, this plate 31 and collar 30 being bolted or otherwise suitably secured to front wall 29 of casing 28.

The outer end wall 33 of casing 24 is thickened and is provided with an outwardly extending annular flange 34 about which plate 27 seats, and with an axial bore in which is mounted a bearing bushing 35. A tubular drive shaft 36 is rotatably mounted through bushing 35 and is provided with radial inlet ducts 37 opening interiorly thereof and opening at their outer ends into an interior circumferential groove 38 in the bushing 35. The shaft 36 extends outward beyond plate 27 and has its outer end portion slightly reduced in diameter to provide a shoulder against which seats a flanged collar 40 keyed on shaft 36 and restrained against outward movement thereon by a thimble 41 threaded into the outer end of shaft 36 and provided at its outer end with a head 42, there being a washer 43 confined between head 42 and the outer end of collar 40. A gear 44 seats on flange 45 of collar 40 and is suitably secured thereto, conveniently by bolts 46. This gear 44, in practice, is driven, through suitable gearing, from the engine crank shaft so that the shaft 36 is driven at predetermined speed relative to the engine crank shaft, as is known.

Figure 2:
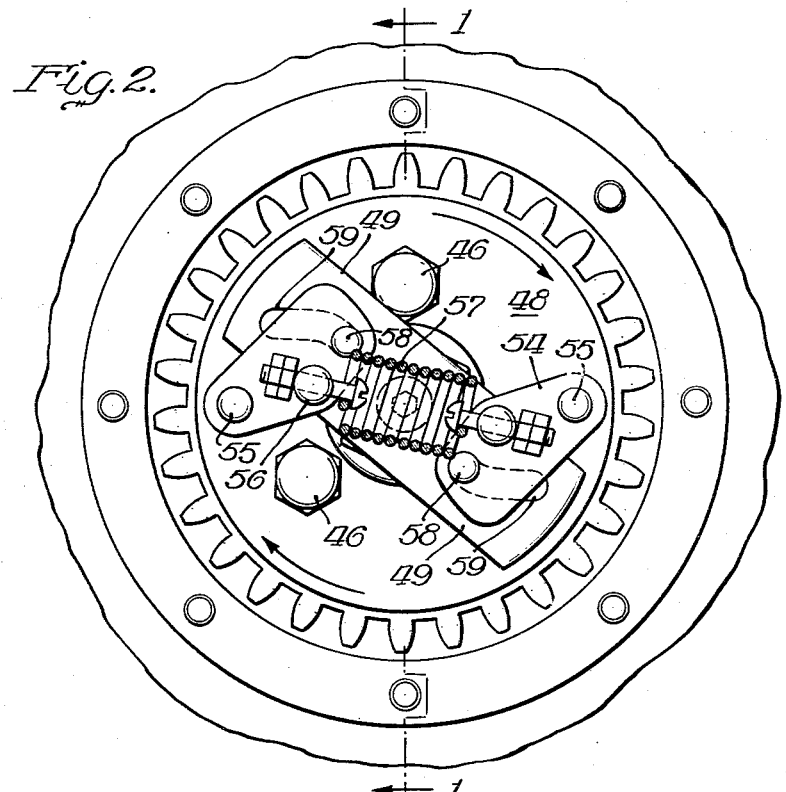
Figure 2 is an end view of the timing means of Figure 1, with the housing cover plate removed and the housing shown fragmentarily, with the parts in the positions which they occupy when the cam shaft of the injection pump is in full retard position.

The bolts 46 pass through an annular clamping and reinforcing plate 48 seating on the web of gear 44 and, in cooperation with the bolts 46, clamping it tightly against flange 45. A substantially oblong arm 49 is keyed on the outer end of a tubular control valve 50 mounted for relative turning movement in drive shaft 36 and extending outward therebeyond. The arm 49 is recessed at its midlength for reception of a spring washer 51 confined between arm 49 and head 52 of a cap screw 53 threaded into the outer end of control valve 50. The outer end portion of control valve 50 is slightly reduced in diameter, as shown in Figure 1, to provide a shoulder between which and the washer 51 arm 49 is confined. Two oppositely disposed fly weights 54, shown more clearly in Figure 2, are pivoted at their outer ends, at 55, on the clamping plate 48, the studs or pivots 55 being secured to plate 48 and projecting an appropriate distance outward therebeyond. Posts 56 are pivotally mounted on weights 54 radially inward thereof beyond the pivot studs 55 and a tension spring 57 extends between and is anchored at its ends to the posts 56. Pins 58 are secured in the fly weights 54, adjacent the ends thereof remote from the pivot studs 55, and extend through oppositely disposed cam slots 59 in the end portions of arms 49. As will be understood from what has been said, the tension spring 57 urges the fly weights 54 toward each other and, when the drive shaft 36 is not rotated, or is rotated at a speed corresponding to or less than the full retard angular position of the pump cam shaft 22 relative to drive shaft 36, as will be explained more fully later, pulls the fly weights 54 into their innermost positions, with the pins 58 at the inner ends of the cam slots 59, as shown in Figure 2. When the speed of rotation of drive shaft 36 is increased to or beyond a predetermined value, which may be termed its advance injection speed, as will be explained more fully later, the fly weights 54 swing outward in opposition to the tension spring 57 and the pins 58, in cooperation with the cam slots 59, turn the arm 49 and thereby turn the control valve 50. The cam slots 59 are so disposed that arm 49 is turned clockwise, as viewed in Figure 2, by outward movement of fly weights 54 and is turned counterclockwise by inward movement thereof. Accordingly, the control valve 50 is turned clockwise responsive to increase in speed of rotation of the drive shaft 36 and is turned counterclockwise responsive to decrease in the speed of rotation of drive shaft 36, within the speed range thereof from full retard injection to full advance injection.

The control valve 50 is provided with an interior bore extending the major portion of its length from its outer end, and with an outer circumferential shoulder 61 confined between the inner end of thimble 41 and an interior shoulder of shaft 36, effective for restraining control valve 50 against endwise movement in either direction while permitting free turning thereof within shaft 36. An elongated closure plug 62 fits tightly within the control valve 50 and extends inward thereof from the inner end of cap screw 53, which restrains plug 62 against outward movement. The inner end of plug 62 is spaced a considerable distance outward from the inner end of the bore extending from the outer end of control valve 50, providing therewith an admission chamber 63 for operating hydraulic fluid, as will be explained more fully later. The plug 62 is provided with an axial inlet duct 64 extending from its inner end and with inlet or admission ports 65 opening radially outward from duct 64, these ports 65 being in register with admission ports 66 in control valve 50 opening radially thereof into the admission ducts 37 in the drive shaft 36. The bearing bushing 35 is provided with an admission port 67 which opens into an admission passage 68 in end wall 33 of casing 24. The outer end portion of passage 68 is enlarged and threaded to receive the threaded end portion of a tube 69 connected to a suitable source of supply of operating hydraulic fluid under appropriate pressure. In practice, the tube 69 is connected to the discharge of an oil pump of suitable known type, which withdraws oil from the sump of the engine crank case and delivers it under appropriate pressure to tube 69. Referring further to Figure 1, the inner end of admission duct 64 is formed to provide a seat for a ball check valve 70 urged in closing direction by a compression spring 71 confined between valve 70 and the inner end of admission chamber 63, for a purpose which will be described later.

The drive shaft 36 is provided, at its inner end, with an enlarged cylindrical head 73 within which are disposed a suitable number—four being shown—of abutment elements 74 of approximately sector shape. These abutment elements 74 fit tightly against the inner circumferential face of head 73, are spaced apart circumferentially thereof and extend radially inward of head 73 a substantial distance. An annular closure plate or ring 75 fits tightly in the inner end of head 73 and is secured therein by bolts 76 passing through the outer end wall 77 of head 73 and through the abutment elements 74 and threading into plate 75, spring washers 78 being confined between wall 77 and the heads of the bolts 76. The abutment elements 74 are clamped tightly between plate 75 and wall 77 and are held accurately in position thereby and by the bolts 76.

Figure 3:
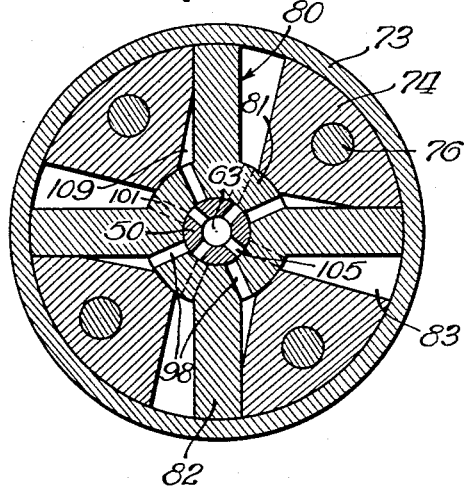
Figure 3 is a sectional view taken substantially on line 3—3 of Figure 1.
Figure 4:
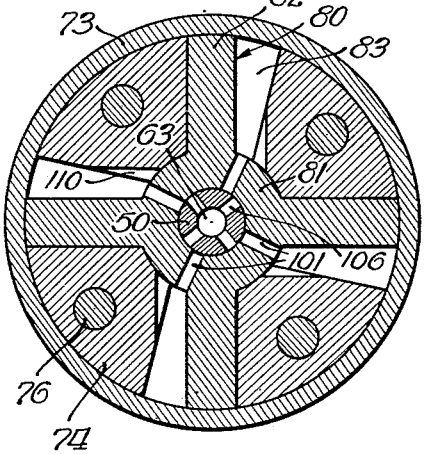
Figure 4 is a sectional view taken substantially on line 4—4 of Figure 1.

The head 73 and closure plate 75 together provide a cylindrical housing closed at its ends for reception of a rotor 80 shown more clearly in Figures 3 and 4. This rotor 80 comprises a central cylindrical hub 81 and vanes 82 integral with and extending radially outward from hub 81 into the spaces 83 between the abutment elements 74. The outer end portion of hub 81 of rotor 80 has a seal, but not tight, fit in the recessed inner end of drive shaft 36 and hub 81 has a seal, but not tight, fit between the inner ends of the abutment elements 74 and through the end closure plate 75. The vanes 82 of rotor 80 are of substantially less thickness than the width of the spaces 83 between the abutment elements 74 and have a seal, but not tight, fit with the circumferential wall of head 73 and with the outer end wall 77 thereof and the end closure plate 75. The control valve 50 is bored out from its inner end to provide an outlet chamber 85 which opens into a chamber 86 of materially greater diameter in hub 81 of rotor 80 opening through the inner end thereof. The inner end of hub 81 is splined in a bolting flange 87 secured by bolts 88 to flange 89 at the outer end of a sleeve 90 keyed on the outer reduced end of cam shaft 22 of the injection pump 20. Chamber 86 receives the head of a cap screw 91 threaded into the end of cam shaft 22, there being a retaining ring 92 and a lock washer 93, of suitable known type, confined between the head of screw 91 and the end of sleeve 90 for restraining the latter against outward movement lengthwise of cam shaft 22, sleeve 90 being restrained against inward movement by the inner race of the ball bearing 23, as will be clear from Figure 1. The bolting flange 87 is provided with suitably disposed discharge ducts 94 extending therethrough from the inner end of hub 81 of rotor 80, for discharge of the hydraulic operating fluid or oil from chamber 86 into the casing 24, as will appear more fully later. The oil is discharged from the lower portion of casing 24 through an opening 95 in end wall 33 of casing 24 and thence downward through casing 28 into the crank case of the engine.

Referring to Figures 3 to 6, inclusive, the rotor 80 is provided with a first set of radial ducts 98, which may be referred to as advance inlet ducts, extending through hub 81 with their radially outer ends at one side of the vanes 82. Rotor 80 is also provided with a first set of ducts 99 extending through the vanes 82 and hub 81 and opening at their outer ends, at 100, at the opposite sides of the vanes 82 from the ducts 98, into the spaces 83 between the abutment elements 74. The ducts 99 may be referred to as advance discharge or outlet ducts, the ducts 98 being the advance inlet ducts. Rotor 80 is further provided with a second set of ducts 101 extending radially through hub 81 with their radially outer ends at the sides of vanes 82 opposite to those at which the ducts 98 are located. The ducts 101 may be referred to as retard inlet ducts. The rotor 80 is additionally provided with a second set of ducts 102 extending lengthwise of the vanes 82 and extending radially through the hub 81, the ducts 102 opening at their outer ends at 103 at the opposite sides of the vanes 82 from the end openings 100 of the ducts 99. Also, as will be noted from Figures 3 and 4, the ducts 101 are disposed at the opposite sides of the vanes 82 from the ducts 98. The ducts 102 may be referred to as the retard discharge or outlet ducts.

The control valve 50 is provided with a first set of radial advance inlet ports 105 extending from the admission chamber 63 and disposed in the same transverse plane as the ducts 98, and with a second set of retard inlet ports 106 opening radially from the inner end of chamber 63 and disposed in the same transverse plane as the inlet retard ducts 101. The control valve 50 is further provided with a first set of advance discharge ports 107 opening radially from the discharge chamber 85 and disposed in the same transverse plane as the advance discharge ducts 99, and with a second set of retard discharge ports 108 opening radially from the discharge chamber 85 and disposed in the same transverse plane as the retard discharge ducts 102. The abutment members 74 are provided at one side thereof with grooves 109 disposed in the same transverse plane as the ducts 98 (Figure 3) for receiving therefrom oil under pressure, and, at their opposite sides, with grooves 110 (Figures 4 and 9) disposed in the same transverse plane as the retard inlet ducts 101 for receiving from the latter oil under pressure.

When the drive shaft 36 is not rotating, or is being driven at a speed less than that requiring advancement of injection, the rotor 80 is in its full retard position, in which the leading faces of the abutment elements 74 are in contact with the vanes 82 of rotor 80, it being understood that the shaft 36 is driven clockwise as indicated by the arrow in Figure 2. The control valve 50 is then also in its maximum counterclockwise or retard position and all of the inlet and discharge ports 105, 106, 107 and 108 thereof are then closed at their radially outer ends by hub 81 of rotor 80, as will be clear from Figures 3 to 6, inclusive. The rotor 80 is then driven from the head 73 through the direct mechanical driving connection provided by the abutment elements 74 and the vanes 82, and the angular relation between the drive shaft 36 and the injection pump cam shaft 22 remains unaltered.

Upon increase in speed of rotation of the drive shaft 36 to a value requiring advancement of injection, the fly weights 54 move outward in opposition to tension spring 57, under the influence of centrifugal force, turning the control valve 50 in clockwise direction. This turning of the control valve 50 brings the advance inlet ports 105 into communication with the advance inlet ducts 98 and oil then flows under pressure from the admission chamber 63 into the grooves 109 of the abutment members 74. The entering oil exerts pressure upon the corresponding faces of the vanes 82 and turns the rotor 80 in clockwise or injection advance direction relative to the associated housing. That advances the angularity of the injection pump cam shaft 22 relative to the drive shaft 36 thereby advancing the timing of injection to the desired extent corresponding to the engine speed. When the desired advancement of injection has been effected, the turning of rotor 80 on the control valve 50 brings the hub 81 of the rotor into such position that it again closes the radially outer ends of the advance inlet ports 105, thus shutting off admission of further oil under pressure. Also, during this clockwise turning of rotor 80 relative to the enclosing housing, the oil at the opposite sides of the vanes 82 from the ducts 98 is displaced and passes through openings or ports 100 and ducts 99 into the discharge chamber 85 of pilot valve 50, from which the oil is returned to the engine crankcase as previously described. As will be understood, when the radially outer ends of the advance inlet ports 105 of control valve 50 are uncovered by turning thereof, the radially outer ends of the advance discharge ports 107 are also uncovered, and when the ports 105 are closed by turning of the rotor 80 the ports 107 are likewise closed. If the speed of rotation of drive shaft 36 continues to increase, the control valve 50 will be turned a further distance clockwise and that may continue until the maximum speed of rotation of drive shaft 36 is reached and the maximum advancement of injection has been attained, at which time the rotor 80 will have been turned into its maximum clockwise position shown in Figure 7. At that time, the vanes 82 of rotor 80 are in contact with the abutment elements 74 and, due to the turning of the rotor 80 about control valve 50, the advance inlet ports 105 and the advance discharge ports 107 are cracked open, with the control valve 50 at the limit of its turning movement clockwise. That is desirable in order to maintain oil under appropriate pressure in the spaces between the vanes 82 and the elements 74, in the event of slight leakage about the vanes, since the drive between the housing and the rotor is then through the oil confined between the vanes 82 and elements 74. As will be understood from what has been said, the rotor 80 and with it the injection pump cam shaft 22, may be advanced to any desired extent, within limits, relative to the drive shaft 36. The rotor 80 and its enclosing housing and associated parts thus constitute servo-motor controlled by the control valve and responsive to the speed of rotation of the drive shaft 36 and, therefore, responsive to engine speed, for automatically advancing the timing of injection in accordance with increase in speed of rotation of drive shaft 36.

When the rotor 80 is in full advance position, with the advance inlet and discharge ports 105 and 107 of control valve 50 cracked open, as shown in Figures 7 and 8, the retard inlet ducts 101 of hub 81 of the rotor 80 are closed at their radially inner ends by the control valve 50 as shown in Figure 7. If the speed of rotation of drive shaft 36 decreases, the control valve 50 is turned counterclockwise thus closing the ports 105 and 107 thereof and opening the ports 106 and 108 to the ducts 101 and 102, respectively, as shown in Figures 9 and 10. Oil then flows under pressure into the grooves 110, at one side of the vanes 82 thus turning the rotor 80 in counterclockwise direction, the oil at the opposite sides of the vanes being discharged through ports 103 and ducts 102 and ports 108 into the discharge chamber 85, from which it is delivered into the casing 24 and thence into casing 28 and downward into the engine crank case, as before. This counterclockwise turning of rotor 80 reduces the angle of advancement of the injection pump cam shaft relative to the drive shaft 36, thereby retarding the timing of injection, as will be understood. If there is no further decrease in the speed of rotation of drive shaft 36, the counterclockwise turning of rotor 80 substantially closes the ports 106 and 108 thus maintaining the angular adjustment between the shafts 36 and 22. If the speed of rotation of drive shaft 36 continues to decrease, the continued turning movement of control valve 50 counterclockwise maintains the ports 106 and 108 open until the rotor 80 is returned to full retard position, shown in Figures 3 to 6, inclusive, at which time all of the ports 105, 106, 107 and 108 of the control valve 50 are again closed, as before. As will be seen, from what has been said, the servo-motor, under control of the control valve 50, is effective for advancing and retarding the timing of injection responsive to increase and decrease in the speed of rotation of the drive shaft 36, throughout the range of turning movement of the rotor 80 relative to the servo-motor housing. In general, an angular adjustment of approximately fifteen degrees of the rotor 80 relative to its associated housing is sufficient, though that angle may be varied to suit conditions. Also, by varying the cam slots 59, the rate of adjustment, or advancing or retarding of the timing of injection, may be adjusted or set to suit any particular engine.

In the operation of the injection pump, the peak torque required occurs at the instant of injection and then falls off rapidly to a minimum. Accordingly, at the instant of injection there would be a tendency to force oil from between the vanes 82 and the abutment members 74 back into and through the admission chamber 63 of the control valve 50, unless that were guarded against. The check valve 70, urged in closing direction by the compression spring 71, shown in Figure 1, guards against back flow of oil through chamber 63 and is conducive to accuracy in operation of the servomotor in the manner above described. The oil or other operating hydraulic fluid delivered to the servomotor is apt to contain a certain amount of dirt, such as carbon and other impurities. Such impurities are urged outward toward the circumferential wall of the housing of the servomotor, during rotation thereof, by centrifugal force, and are removed therefrom through the passages 99 and ports 100 thereof, and through the passages or ducts 102 and the ports 103 thereof. In that manner, dirt which would tend to accumulate within the servomotor and might cause clogging thereof to such an extent as to objectionably interfere with its accuracy in operation, is continuously removed therefrom, which is conducive to accuracy in the timing of injection. It will also be noted that the movable parts of the servomotor, including the control valve 50, operate in oil, which eliminates friction and resultant wear and further contributes to accuracy and ease of operation.

The modification shown in Figures 11 to 15, inclusive, is, in general, quite similar to the form shown in Figure 1 and the parts of such modification corresponding to parts shown in Figure 1 have been numbered the same as the latter parts with the exponent *a* added. Referring to Figure 11, the control valve 112 is slidably mounted in the drive shaft 36*a* and is provided, at its outer end, with a flanged head 113. A spur gear 114 is keyed, at 115, on the outer end of drive shaft 36*a* and is provided with outwardly projecting brackets 116 on which are pivotally mounted, at 117, two oppositely disposed fly weights 118 of substantially L-shape. Cam elements 119 of the inner arms of the weights 118 contact the inner face of head 113 at opposite sides thereof. The control valve 112 is held against turning relative to drive shaft 36*a* by a key 119*a* set in control valve 112 slidable in a key way 120 in shaft 36*a*. The control valve 112 is thus slidable in either direction in shaft 36*a* but is held against relative turning movement.

A plunger 120*a* is slidable through a boss 121 extending outwardly from the outer wall 29*a* of the casing 28*a*. This plunger 120*a* is provided at its inner end with a flanged head 122 and a compression spring 123, disposed about plunger 120*a*, is confined between head 122 thereof and wall 29*a*. At its inner end the plunger 120*a* is provided with a short stud 124 which bears against the outer end of control valve 112 in rubbing pressure contact therewith. Upon increase in the speed of rotation of drive shaft 36*a* the fly weights 118 move the control valve 112 outward in opposition to the compression spring 123, and upon decrease in rotation of speed of shaft 36*a* the compression spring 123 moves the control valve 112 inward.

The control valve 112 is provided, adjacent the inner end of admission chamber 63*a* thereof, with inclined or helical grooves 126 of appreciable depth, and with ports 127 opening radially thereof from admission chamber 63*a* into the respective grooves 126. The control valve 112 is further provided, at its inner end portion and in the area of the discharge chamber 85*a*, with inclined or helical grooves 128 of appreciable depth opening through the inner end of control valve 112, and with radial ports 129 opening from discharge chamber 85*a* into the respective grooves 128. Hub 81*a* of the rotor 80*a* extends inward beyond closure plate 75*a* of the housing for the servomotor and receives the outer end of the injection pump cam shaft 22*a* splined therein for rotation therewith. The bore in hub 81*a* which receives the splined end of shaft 22*a* extends outward a substantial distance therebeyond to provide a discharge chamber 86*a* from which extend radial discharge ports 130. Oil delivered to chamber 86*a* passes through the ports 130 into the casing 24, from which it is discharged through opening 95*a* into housing 28*a* and thence downward into the engine crank case, as before.

When the drive shaft 36*a* is not rotated, or is rotating at a speed below that requiring advancement of the timing of injection, the parts are in their positions shown in Figures 11 and 12. The grooves 126 and 128 are then disposed midway between the ducts 98*a* and 101*a* and the ducts 99*a* and 102*a*, as shown more clearly in Figure 12, in which the relation between the ducts and the grooves is indicated by indicating the ducts in dotted lines at the transverse mid-portion of the control valve 112. It will be seen that the ducts 98a and 101a and the ducts 99a and 102a are then closed and no oil enters the servo-motor, rotor 80a thereof then being in its full retard position previously described in connection with Figures 1 to 10, inclusive. When the speed of rotation of shaft 36a is increased to a value requiring advanced timing of injection, the control valve 112 is moved outward by the fly weights 118. That moves the grooves 126 and 128 into positions uncovering or opening the ducts 98a and 99a, which may then be cracked open as shown in Figure 13. Oil under pressure then flows from the admission chamber 63a through the ducts 98a into the servo-motor and is effective for turning the rotor 80a thereof clockwise, the displaced oil being discharged through ducts 99a, grooves 128 and ports 129 and the discharge chamber 85a, to permit clockwise turning of rotor 80a for advancing injection. If there is no further increase in the speed of rotation of shaft 36a, the ducts 98a and 99a may remain cracked open for retaining the rotor 80a in its adjusted angular position, to compensate for the slight leakage around the rotor vanes 82a. If the speed of rotation of shaft 36a continues to increase, the increasing outward movement of control valve 112 causes further uncovering or opening of the ducts 98a and 99a, with resultant further clockwise turning of rotor 80a until maximum advance of injection has been attained, at which time the ducts 98a and 99a remain cracked slightly open as and for the purpose previously described.

As is shown more clearly in Figure 14, when the control valve 112 is at the limit of its movement toward the left, which is its full advance position, the ducts 98a and 99a of the rotor 80a are cracked slightly open, as above described, and the ducts 101a and 102a are then spaced from the grooves 126 and 128 at the opposite sides thereof from the ducts 98a and 99a. When the speed of rotation of the drive shaft 36a decreases, the control valve 112 is moved in retard direction, toward the right. This movement of the control valve brings the grooves 126 and 128 thereof into position such that the ducts 101a and 102a are cracked slightly open, thereby causing turning of the rotor 80a in counterclockwise or retard direction, until the ducts 101a and 102a are again closed by such turning of the rotor. If the speed of rotation of the drive shaft 36a then remains constant, the rotor will remain in the retard position to which it has been turned. If the speed of rotation of drive shaft 36a continues to decrease, the control valve 112 will continue to move inward or in retard direction, thus maintaining the ducts 101a and 102a in communication with the grooves 126 and 128 until the rotor 80a has been turned a further distance in retard direction, or has been turned into its full retard position. When the rotor reaches the latter position, the control valve 112 is in its position shown in Figure 15 closing all of the ducts of the rotor which is then driven by the servo-motor housing through the abutment elements 74a thereof which are now in contact with the vanes 82a of the rotor 80a, providing a direct mechanical drive between the housing and the rotor. Briefly, the retard operation is similar to the advance operation, except that the rotor of the servo-motor is turned counterclockwise relative to the housing instead of clockwise, and in the full retard position of the rotor has direct mechanical driving connection to the associated housing. In both cases, the angular relation of the injection pump cam shaft relative to the drive shaft is automatically adjusted responsive to speed of the drive shaft for varying the timing of injection in accordance with variations in the speed of the engine.

The modified form shown in Figures 16 to 19, inclusive, is, in general, quite similar to that shown in Figures 11 to 15, inclusive, except that the control valve is adjusted manually and is retained in set position for a desired angle of retard or advance. Referring to Figure 16, the control valve 112a is feathered through the drive shaft for relative axial movement in either direction, spur gear 114a being keyed on the drive shaft as before. An adjusting screw 133 is threaded through the outer wall 29a of housing or casing 28a and is provided, at its inner end, with a split flanged coupling 134 bolted thereto and snugly, but not tightly, engaging about the flanged head 113a of control valve 112a. A toothed adjusting wheel 135 is fixed on the outer end of screw 133 and is releasably held against turning movement by a spring detent 136 engaging therewith and mounted on wall 29a of the housing 28a. As will be understood from what has been said, by turning the screw 133 in proper direction the control valve 112a may be moved axially in either direction to the desired extent to produce the desired advance or retard of timing injection to suit the particular fuel used. The injection timing means of my invention is thus also well suited for use as an octane selector whereby the timing of injection may be set for most efficient operation of the engine with the fuel used therein, thereby permitting use of any selected one of a plurality of engine fuels. Such a selector may be used to advantage with engines normally operating through a comparatively narrow speed range, as above noted. When so used, the injection timing means of my invention has all of the advantages above referred to with the exception that it is not automatic and responsive to variations in engine speed.

The modification shown in Figures 20, 21 and 22 is, in general quite similar to the form shown in Figures 1 to 10, inclusive. The same reference numbers, with exponents to indicate minor differences, have been used to indicate the same parts in Figures 20, 21 and 22 as in Figures 1 to 10, inclusive. It will suffice to describe the differences in structure and operation between the form of Figures 1 to 10, inclusive, and the form of Figures 20, 21 and 22.

Referring to Figure 20, the inner end of drive shaft 36b and the outer end wall 77b of housing 73b are recessed for reception of a frusto-conical head 140 at the inner end of control valve 50a. This head 140 is provided at its inner base with a circumferential flange 141 which has a seal, but not tight, fit in wall 77b. The recess in wall 77b and drive shaft 36b provides an oil inlet receiving chamber 142 extending about head 140, outwardly beyond flange 141, and about the adjacent end of body portion of control valve 50a. The inner end of control valve 50a is closed by a screw plug 143 carrying a stud 144 which limits the movement of ball valve 70b away from its seat. The hub 81b of rotor 80b is bored out from its inner end and receives the reduced outer end portion of pump shaft 22, which is keyed in hub 81b, the two being restrained against relative endwise movement by a headed cap screw 91b and associated parts, in the same manner as in Figure 1. The bore of hub 81b extends outward beyond the head of cap screw 91b, providing an oil outlet receiving chamber 145, from which outlet passages or ducts 146 extend through hub 81b, opening through the inner end thereof. The control valve 50a is provided, adjacent the outer end of head 140, with radial oil inlet ports 147 opening from the oil admission chamber 63b into the oil inlet receiving chamber 142.

The hub 81b is provided, at its inner end, with inclined advance inlet ducts 98b and retard inlet ducts 101b, of substantially L-shape and arranged in pairs. The ducts 98b open, at their radially outer ends, through the circumferential area of hub 81b at one side of the repective vanes 80b, and open at their radially inner ends through outer end of hub 81b beneath flange 141. The ducts 101b open, at their radially outer ends, through the circumferential area of hub 81b at the other side of the respective vanes 82b, and open at their radially inner ends through the outer end of hub 81b beneath flange 141. Each of the vanes 82b of rotor 80b is provided with an advance discharge duct 99b opening at its radially outer end through the side of vane 82b at which duct 101b opens, through a port 100b. The radially inner end of duct 99b opens through the outer end of hub 81b, through a port 100c.

Each vane 82b is also provided with a retard discharge duct 102b opening at its radially outer end through the other side of vane 82b, at which duct 98b opens, through a port 103b. The radially inner end of duct 102b opens through the outer end of hub 81b, through a port 103c.

Flange 141 of the control valve head 140 is provided with oil admission ports 148 therethrough spaced the same distance from the axis of control valve 50a as the radially inner ends of the ducts 98b and 101b. The valve disc, comprising head 140 and its flange 141, is provided in its inner face with radially disposed grooves 149 of a length to establish communication between the ports 100c and 103c, selectively, and the oil outlet receiving chamber 145, at appropriate times, as will appear more fully later. When the engine is idling, or is stopped, the control valve 50a is in full retard position and the vanes 82b are in contact with the abutment members 74b establishing mechanical driving connection between housing 24b and rotor 80b, as previously explained. The ports 148 are then disposed midway between the radially inner end of the respective pairs of ducts 98b and 101b, grooves 149 are disposed midway between the respective pairs of ports 100c and 103c, and the ducts 98b open at their radially outer ends into the grooves 109c in the abutment members 74b. The valve disc is then effective for closing off the oil inlet receiving chamber 142 from all of the ports and ducts in hub 81b.

When the engine speeds up, requiring advancement of timing of injection, the control valve 50a is turned clockwise relative to rotor 80b. That moves ports 148 into position to overlap the inner ends of ducts 98b and also moves grooves 149 into position to overlap ports 100c, as shown in Figure 21. Oil under pressure then flows into the spaces 14c between the vanes 82b and the abutment members 74b, and displaced oil escapes from the spaces 16c between the vanes 82b and the abutment members 74b, through ducts 99b, grooves 149, chamber 145, and passages 146, this oil being returned to the engine crank case in the manner previously described. In that manner the rotor 80b, and with it the pump shaft 22, is turned clockwise until the required advancement in timing has been attained. At that time, ducts 98b and 100c are substantially closed providing a hydraulic lock effective for maintaining the advancement in timing, assuming that the engine is then operating at constant speed. To compensate for any oil leakage from chamber 14c to chamber 16c, around the vanes 82b, ducts 98b and 100c are slightly open to ports 148 and grooves 149. If the speed of the engine is again increased the timing of injection is again advanced to an appropriate extent, in the manner above described.

In Figure 22 it is assumed that the timing of injection has been advanced to such an extent that the rotor vanes 82b are in approximately their positions there shown, and that the speed of the engine is being reduced. Reduction in speed of the engine causes counterclockwise turning of the control valve 50a relative to the rotor 80b. That moves the ports 148 and the grooves 149 into position to overlap the inner ends of the ducts 101b and the ports 103c. Oil under pressure then flows through ducts 101b and grooves 110c in members 74b into the spaces 16c between vanes 82b and the abutment members or elements 74b. At the same time, oil is displaced from the spaces 14c and escapes therefrom through ducts 102b, grooves 149, chamber 145 and passages 146, as before. The rotor 80b is thus turned counterclockwise relative to control valve 50a until the required retardment of timing of injection has been attained, at which time the ducts 101b and the ports 103c are closed off, thus effecting a hydraulic lock to maintain the rotor 80b in a fixed position relative to the control valve head 140. In either case—advance or retard—the valve disc comprising the control valve head 140 and its flange 141 is subjected to the pressure of the oil in chamber 142, and is held thereby seated in sealing contact against the outer end of hub 81b of rotor 80b. That effectively guards against leakage between the valve disc and the hub of the rotor, which would be objectionable for obvious reasons, and is conducive to accuracy in operation.

The timing means of my invention is particularly suitable for timing the injection in injection engines, and has been described as used for that purpose, by way of example. In its broader aspects, however, it may be used for varying the angular relation between a drive shaft or member and any driven shaft or member. Accordingly, the driven shaft may be, for example, a cam shaft for actuating the valves of an aspiration internal combustion engine receiving fuel-air mixture from a carburetor or other suitable source, or any other shaft or member which it is desirable to adjust for timing purposes.

As above indicated, and as will be understood by those skilled in this art, changes in detail may be resorted to without departing from the field and scope of my invention, and I intend to include all such variations, as fall within the scope of the appended claims, in this application in which the preferred forms only of my invention have been disclosed.

I claim:

1. In means for varying the angular relation between two shafts, a driven shaft, a tubular drive shaft coaxial with said driven shaft, a servo-motor providing driving connection between said shafts comprising a housing fixed to said drive shaft and a rotor within said housing fixed to said driven shaft, said housing having circumferentially spaced abutment elements fixed thereto and extending radially inward thereof, said rotor having a tubular hub in sealing contact with the inner ends of said elements and with said housing and vanes of materially less thickness than the spaces between said abutment members and fixed to said hub extending radially outward therefrom between said abutment members in sealing contact with said housing, said hub being provided with an advance inlet duct at one side of each vane and a retard inlet duct at the opposite side of each vane, each vane being provided with an advance outlet duct and a retard outlet duct extending radially outward thereof a substantial distance beyond said hub and opening at their radially inner ends into said hub, said advance outlet ducts opening at their radially outer ends at said opposite sides of the respective vanes and said retard outlet ducts opening at their radially outer ends at said one side of the respective vanes, and a control valve mounted in said drive shaft and hub and adjustable relative thereto in opposite directions, said control valve having inlet and outlet ports cooperating with said inlet and outlet ducts for controlling admission and exhaust of operating hydraulic fluid o and from said servo-motor effective for advancing and retarding said rotor relative to said housing responsive to adjustment of said valve, said advance and retard outlet ducts being effective for discharging from said spaces said operating hydraulic fluid and contained foreign materials forced outwardly of said housing by centrifugal force, upon relative turning movement between said rotor and said housing.

2. In means for varying the angular relation between two shafts, a driven shaft, a tubular drive shaft coaxial with said driven shaft, a servo-motor providing driving connection between said shafts comprising a housing fixed to said drive shaft and a rotor within said housing fixed to said driven shaft, said housing having circumferentially spaced abutment elements fixed thereto and extending radially inward thereof, said rotor having a tubular hub in sealing contact with the inner ends of said elements and with said housing and vanes of materially less thickness than the spaces between said abutment members and fixed to said hub extending radially outward therefrom between said abutment members in sealing contact with said housing, said hub being provided with a substantially radial advance inlet duct at one side of each vane and a substantially radial retard inlet duct at the opposite side of each vane, each vane being provided with an advance outlet duct and a retard outlet duct extending radially outward thereof a substantial distance beyond said hub and opening at their radially inner ends into said hub, said advance outlet ducts opening at their radially outer ends at said opposite sides of the respective vanes and said retard outlet ducts opening at their radially outer ends at said one side of the respective vanes, a control valve mounted in said drive shaft and hub for relative turning movement in opposite directions, said control valve having inlet and outlet ports cooperating with said inlet and outlet ducts for controlling admission and exhaust of operating hydraulic fluid to and from said servo-motor effective for advancing and retarding said rotor relative to said housing responsive to adjustment of said valve, and means for turning said control valve in advancing direction and in retarding direction responsive to increase and decrease respectively in the speed of rotation of said drive shaft, said advance and retard outlet ducts being effective for discharging from said spaces said operating hydraulic fluid and contained foreign materials forced outwardly of said housing by centrifugal force, upon relative turning movement between said rotor and said housing.

3. In means for varying the angular relation between two shafts, a driven shaft, a tubular drive shaft coaxial with said driven shaft, a servo-motor providing driving connection between said shafts comprising a housing fixed to said drive shaft and a rotor within said housing fixed to said driven shaft, said housing having circumferentially spaced abutment elements fixed thereto and extending radially inward thereof, said rotor having a tubular hub in sealing contact with the inner ends of said elements and with said housing and vanes of materially less thickness than the spaces between said abutment members and fixed to said hub extending radially outward therefrom between said abutment members in sealing contact with said housing, said hub being provided with a substantially radial advance inlet duct at one side of each vane and a substantially radial retard inlet duct at the opposite side of each vane, each vane being provided with an advance outlet duct and a retard outlet duct extending radially outward thereof a substantial distance beyond said hub and opening at their radially inner ends into said hub, said advance outlet ducts opening at their radially outer ends at said opposite sides of the respective vanes and said retard outlet ducts opening at their radially outer ends at said one sides of the respective vanes, a control valve mounted in said drive shaft and hub and axially adjustable relative thereto in opposite directions, said control valve having inlet and outlet ports cooperating with said inlet and outlet ducts for controlling admission and exhaust of operating hydraulic fluid to and from said servo-motor effective for advancing and retarding said rotor relative to said housing responsive to adjustment of said valve, and means for adjusting said control valve axially in advancing direction and in retarding direction responsive to increase and decrease respectively in the speed of rotation of said drive shaft, said advance and retard outlet ducts being effective for discharging from said spaces said operating hydraulic fluid and contained foreign materials forced outwardly of said housing by centrifugal force, upon relative turning movement between said rotor and said housing.

4. In means for varying the angular relation between two shafts, a driven shaft, a tubular drive shaft coaxial with said driven shaft, a servo-motor providing driving connection between said shafts comprising a housing fixed to said drive shaft and a rotor within said housing fixed to said driven shaft, said housing having circumferentially spaced abutment elements fixed thereto and extending radially inward thereof, said rotor having a tubular hub in sealing contact with the inner ends of said elements and with said housing and vanes of materially less thickness than the spaces between said abutment members and fixed to said hub extending radially outward therefrom between said abutment members in sealing contact with said housing, said hub being provided with a substantially radial advance inlet duct at one side of each vane and a substantially radial retard inlet duct at the opposite side of each vane, each vane being provided with an advance outlet duct and a retard outlet duct extending radially outward thereof a substantial distance beyond said hub and opening at their radially inner ends into said hub, said outlet ducts extending to the radially outer ends of said vanes, said advance outlet ducts openings at their radially outer ends at said opposite sides of the respective vanes and said retard outlet ducts opening at their radially outer ends at said one sides of the respective vanes, and a control valve mounted in said drive shaft and hub and axially adjustable relative thereto in opposite directions, said control valve having inlet and outlet ports cooperating with said inlet and outlet ducts for controlling admission and exhaust of operating hydraulic fluid to and from said servo-motor effective for advancing and retarding said rotor relative to said housing responsive to adjustment of said valve, said advance and retard outlet ducts being effective for discharging from said spaces said operating hydraulic fluid and contained foreign materials forced outwardly of said housing by centrifugal force, upon relative turning movement between said rotor and said housing.

5. In means for varying the angular relation between two shafts, a driven shaft, a drive shaft, a servo-motor providing driving connection between said shafts comprising a housing fixed to said drive shaft and a rotor within said housing fixed to said driven shaft, said housing having circumferentially spaced abutment elements fixed thereto and extending radially inward thereof, said rotor having radial vanes of materially less thickness than the spaces between said elements and extending therebetween in sealing contact with said housing, means for admitting hydraulic fluid under pressure to said spaces at one side of said vanes responsive to increase in speed of said drive shaft while excluding admission of hydraulic fluid to said spaces at the opposite sides of said vanes and for admitting hydraulic fluid under pressure to said spaces at the opposite sides of said vanes responsive to decrease in speed of said drive shaft while excluding admission of hydraulic fluid to said spaces at said one side of said vanes, the latter being provided with advance outlet ducts opening adjacent the outer ends of said vanes into said spaces at said opposite sides of said vanes and with retard outlet ducts opening adjacent the outer ends of said vanes into said spaces at said one side of said vanes, said ducts being effective for discharging from said spaces said hydraulic fluid and contained foreign materials forced outwardly of said housing by centrifugal force, upon relative turning movement between said rotor and said housing.

References Cited in the file of this patent

UNITED STATES PATENTS

| | | |
|---|---|---|
| 2,107,070 | Fluery | Feb. 1, 1938 |
| 2,446,497 | Thomas | Aug. 3, 1948 |
| 2,488,361 | Witzky et al. | Nov. 15, 1949 |

FOREIGN PATENTS

| | | |
|---|---|---|
| 561,811 | Great Britain | 1944 |